(12) United States Patent
Pannell et al.

(10) Patent No.: US 9,809,656 B2
(45) Date of Patent: Nov. 7, 2017

(54) FEEDING POLYMERIZATION ADDITIVES TO POLYMERIZATION PROCESSES

(71) Applicant: Univation Technologies, LLC, Houston, TX (US)

(72) Inventors: Richard B. Pannell, Kingwood, TX (US); David M. Glowczwski, Baytown, TX (US); Chi-I Kuo, Humble, TX (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 15/101,512

(22) PCT Filed: Sep. 25, 2014

(86) PCT No.: PCT/US2014/057467
§ 371 (c)(1),
(2) Date: Jun. 3, 2016

(87) PCT Pub. No.: WO2015/088624
PCT Pub. Date: Jun. 18, 2015

(65) Prior Publication Data
US 2016/0311937 A1    Oct. 27, 2016

Related U.S. Application Data

(60) Provisional application No. 61/913,506, filed on Dec. 9, 2013.

(51) Int. Cl.
| | | |
|---|---|---|
| *C08F 2/38* | (2006.01) | |
| *C08F 2/00* | (2006.01) | |
| *C08F 2/34* | (2006.01) | |
| *C08F 2/44* | (2006.01) | |
| *C08K 5/098* | (2006.01) | |

(52) U.S. Cl.
CPC .............. *C08F 2/005* (2013.01); *C08F 2/34* (2013.01); *C08F 2/44* (2013.01); *C08K 5/098* (2013.01)

(58) Field of Classification Search
CPC .... C08F 2/005; C08F 2/34; C08F 2/44; C08F 10/00; C08K 5/098
USPC ...................................... 526/216, 88, 82, 84
See application file for complete search history.

(56) References Cited

U.S. PATENT DOCUMENTS

| | | |
|---|---|---|
| 3,709,853 A | 1/1973 | Karapinka |
| 3,709,954 A | 1/1973 | Karol |
| 4,003,712 A | 1/1977 | Miller |
| 4,011,382 A | 3/1977 | Levine et al. |
| 4,012,574 A | 3/1977 | Jones et al. |
| 4,077,904 A | 3/1978 | Noshay et al. |
| 4,102,817 A | 7/1978 | Throckmorton et al. |
| 4,155,880 A | 5/1979 | Saltman et al. |
| 4,182,814 A | 1/1980 | Bernemann et al. |
| 4,302,566 A | 11/1981 | Karol et al. |
| 4,376,062 A | 3/1983 | Hamer et al. |
| 4,379,758 A | 4/1983 | Wagner et al. |
| 4,472,559 A | 9/1984 | Maehara et al. |
| 4,543,399 A | 9/1985 | Jenkins, III et al. |
| 4,665,208 A | 5/1987 | Welborn, Jr. et al. |
| 4,874,734 A | 10/1989 | Kioka et al. |
| 4,882,400 A | 11/1989 | Dumain et al. |
| 4,908,463 A | 3/1990 | Bottelberghe |
| 4,924,018 A | 5/1990 | Bottelberghe |
| 4,952,540 A | 8/1990 | Kioka et al. |
| 4,968,827 A | 11/1990 | Davis |
| 5,026,795 A | 6/1991 | Hogan |
| 5,034,480 A | 7/1991 | Funk et al. |
| 5,034,481 A | 7/1991 | Funk et al. |
| 5,041,584 A | 8/1991 | Crapo et al. |
| 5,066,736 A | 11/1991 | Dumain et al. |
| 5,091,352 A | 2/1992 | Kioka et al. |
| 5,103,031 A | 4/1992 | Smith, Jr. |
| 5,126,414 A | 6/1992 | Cooke et al. |
| 5,157,137 A | 10/1992 | Sangokoya |
| 5,204,419 A | 4/1993 | Tsutsui et al. |
| 5,206,199 A | 4/1993 | Kioka et al. |
| 5,235,081 A | 8/1993 | Sangokoya |
| 5,248,801 A | 9/1993 | Sangokoya |
| 5,317,036 A | 5/1994 | Brady, III et al. |
| 5,329,032 A | 7/1994 | Tran et al. |

(Continued)

FOREIGN PATENT DOCUMENTS

| | | |
|---|---|---|
| EP | 0279586 | 8/1988 |
| EP | 0453116 | 10/1991 |
| EP | 0511665 | 11/1992 |
| EP | 0516476 | 12/1992 |
| EP | 0517868 | 12/1992 |
| EP | 0549252 | 6/1993 |
| EP | 0561476 | 9/1993 |
| EP | 0594218 | 4/1994 |
| EP | 0767184 | 4/1997 |
| EP | 0794200 | 9/1997 |
| WO | 94/10180 | 5/1994 |
| WO | 96/08520 | 3/1996 |
| WO | 96/11961 | 4/1996 |
| WO | 97/06186 | 2/1997 |
| WO | 97/14721 | 4/1997 |
| WO | 97/15602 | 5/1997 |
| WO | 97/27224 | 7/1997 |
| WO | 97/46599 | 12/1997 |
| WO | 99/40125 | 8/1999 |
| WO | 99/47598 | 9/1999 |
| WO | 99/48605 | 9/1999 |
| WO | 99/50311 | 10/1999 |
| WO | 99/60033 | 11/1999 |
| WO | 2005003184 | 1/2005 |

OTHER PUBLICATIONS

International Search Report and Written Opinion for related PCT Application PCT/US2014/057467, dated Dec. 15, 2014 (9 pgs).

*Primary Examiner* — William Cheung
(74) *Attorney, Agent, or Firm* — Brooks, Cameron & Huebsch, PLLC

(57) ABSTRACT

Processes for making and using a viscosified liquid slurry polymerization additive are disclosed herein. The process for making a viscosified liquid slurry polymerization additive comprises contacting a polymerization additive with a liquid to form a liquid slurry polymerization additive, and shearing the liquid slurry polymerization additive to increase its viscosity and thus form the viscosified liquid slurry polymerization additive. The process for using a viscosified liquid slurry polymerization additive comprises contacting, under polymerization conditions, in a reactor system: a catalyst system, one or more monomers, and at least one viscosified liquid slurry polymerization additive.

17 Claims, No Drawings

(56) References Cited

U.S. PATENT DOCUMENTS

| | | |
|---|---|---|
| 5,332,706 A | 7/1994 | Nowlin et al. |
| 5,352,749 A | 10/1994 | DeChellis et al. |
| 5,427,991 A | 6/1995 | Turner |
| 5,461,123 A | 10/1995 | Song et al. |
| 5,473,028 A | 12/1995 | Nowlin et al. |
| 5,492,975 A | 2/1996 | Peifer et al. |
| 5,541,270 A | 7/1996 | Chinh et al. |
| 5,610,244 A | 3/1997 | Govoni et al. |
| 5,627,243 A | 5/1997 | Hämäläinen et al. |
| 5,643,847 A | 7/1997 | Walzer, Jr. |
| 5,661,095 A | 8/1997 | Meverden et al. |
| 5,665,818 A | 9/1997 | Tilston et al. |
| 5,677,375 A | 10/1997 | Rifi et al. |
| 5,965,477 A | 10/1999 | Sivaram et al. |
| 5,972,510 A | 10/1999 | O'Hare et al. |
| 6,034,187 A | 3/2000 | Maehama et al. |
| 6,472,484 B1 | 10/2002 | Abe et al. |
| 6,894,131 B2 | 5/2005 | McCullough et al. |
| 6,933,258 B2 | 8/2005 | Agapiou et al. |
| 7,205,363 B2 | 4/2007 | Dickey et al. |
| 2007/0244271 A1 | 10/2007 | Muhle et al. |
| 2008/0319583 A1 | 12/2008 | Hagerty et al. |
| 2010/0289482 A1 | 11/2010 | Markel et al. |
| 2011/0077370 A1 | 3/2011 | Agapiou et al. |
| 2011/0184124 A1* | 7/2011 | Stakem .................. C08F 6/003 524/773 |
| 2011/0256632 A1 | 10/2011 | Hussein et al. |
| 2011/0275772 A1 | 11/2011 | Savatsky et al. |
| 2012/0046428 A1 | 2/2012 | Kao et al. |
| 2012/0271015 A1 | 10/2012 | Kao et al. |
| 2012/0271017 A1 | 10/2012 | Rix et al. |

\* cited by examiner

FEEDING POLYMERIZATION ADDITIVES TO POLYMERIZATION PROCESSES

This application is a National Stage Application under 35 U.S.C. §371 of International Application Number PCT/US2014/057467,filed Sep. 25, 2014 and published as WO 2015/088624 on Jun. 18, 2015,which claims the benefit to U.S. Provisional Application 61/913,506, filed Dec.9, 2013, the entire contents of which are incorporated herein by reference in its entirety.

FIELD OF THE DISCLOSURE

Disclosed herein are systems and processes for feeding polymerization additives to polymerization processes, such as a gas-phase olefin polymerization process. Disclosed herein are processes for viscosifying liquid slurry polymerization additives to facilitate more efficient feed of the polymerization additives to polymerization processes, and polymerization processes using the viscosified liquid slurry polymerization additive.

BACKGROUND

Sheeting and chunking has been a problem in commercial polyolefin production reactors for many years. In gas phase reactors, the problem is generally characterized by the formation of solid masses of polymer on the walls or dome of the reactor. These solid masses of polymer (e.g., the sheets) eventually become dislodged and fall into the reaction section, where they may interfere with fluidization, block the product discharge port, plug the distributor plate, and force a reactor shut-down for cleaning, any one of which can be termed a "discontinuity event," which in general is a disruption in the continuous operation of a polymerization reactor. The terms "sheeting, chunking and/or fouling," while used synonymously herein, may describe different manifestations of similar problems, in each case which can lead to a reactor discontinuity event.

There are at least two distinct forms of sheeting that occur in gas phase reactors. The two forms (or types) of sheeting are described as wall sheets or dome sheets, depending on where they are formed in the reactor. Wall sheets are formed on the walls (generally vertical sections) of the reaction section. Dome sheets are formed much higher in the reactor, on the conical section of the dome, or on the hemi-spherical head on the top of the reactor.

When sheeting occurs with Ziegler-Natta catalysts, it is generally wall sheeting. Dome sheeting may occur with Ziegler-Natta catalysts, but the occurrence is rare. However, with metallocene catalysts, sheeting may be wall sheeting and/or dome sheeting.

As a result of the reactor discontinuity problems caused by sheeting, various techniques have been proposed to improve reactor operability. For example, various supporting procedures or methods for producing a catalyst system with reduced tendencies for fouling and better operability have been discussed in U.S. Pat. No. 5,283,218. U.S. Pat. Nos. 5,332,706 and 5,473,028 disclose a particular technique for forming a catalyst by "incipient impregnation." U.S. Pat. Nos. 5,427,991 and 5,643,847 disclose the chemical bonding of non-coordinating anionic activators to supports. U.S. Pat. No. 5,492,975 discloses polymer bound metallocene catalyst systems. U.S. Pat. No. 5,661,095 discloses supporting a metallocene catalyst on a copolymer of an olefin and an unsaturated silane. WO 97/06186 discloses removing inorganic and organic impurities after formation of the metallocene catalyst itself. WO 97/15602 discloses readily supportable metal complexes. WO 97/27224 discloses forming a supported transition metal compound in the presence of an unsaturated organic compound having at least one terminal double bond.

Others have discussed different process modifications for improving reactor continuity with metallocene catalysts and conventional Ziegler-Natta catalysts. For example, WO 97/14721 discloses the suppression of fines that can cause sheeting by adding an inert hydrocarbon to the reactor. U.S. Pat. No. 5,627,243 discloses a distributor plate for use in fluidized bed gas phase reactors. WO 96/08520 discloses avoiding the introduction of a scavenger into the reactor. U.S. Pat. No. 5,461,123 discloses using sound waves to reduce sheeting. U.S. Pat. No. 5,066,736 and EP-A1 0 549 252 disclose the introduction of an activity retarder to the reactor to reduce agglomerates. U.S. Pat. No. 5,610,244 discloses feeding make-up monomer directly into the reactor above the bed to avoid fouling and improve polymer quality. U.S. Pat. No. 5,126,414 discloses including an oligomer removal system for reducing distributor plate fouling and providing for polymers free of gels. There are various other known methods for improving operability including coating the polymerization equipment, controlling the polymerization rate, particularly on start-up, reconfiguring the reactor design, and injecting various agents into the reactor.

Others have discussed injecting various agents into the reactor. The use of antistatic agents, for example, has been the subject of various publications. U.S. Pat. No. 7,205,363 and WO 2005/003184 disclose the use of certain antistatic agents with metallocene catalysts to improve reactor operability. EP-A1 0 453 116 discloses the introduction of antistatic agents to the reactor for reducing the amount of sheets and agglomerates. U.S. Pat. No. 4,012,574 discloses adding a surface-active compound having a perfluorocarbon group to the reactor to reduce fouling. WO 96/11961 discloses an antistatic agent for reducing fouling and sheeting in a gas, slurry or liquid pool polymerization process as a component of a supported catalyst system. U.S. Pat. Nos. 5,034,480 and 5,034,481 disclose a reaction product of a conventional Ziegler-Natta titanium catalyst with an antistatic agent to produce ultrahigh molecular weight ethylene polymers. For example, WO 97/46599 discloses the use of soluble metallocene catalysts in a gas phase process utilizing soluble metallocene catalysts that are fed into a lean zone in a polymerization reactor to produce stereoregular polymers. WO 97/46599 also discloses that the catalyst feedstream can contain antifoulants or antistatic agents such as ATMER 163 (commercially available from Croda, Edison, NJ USA). See also U.S. Pat. No. 7,205,363 and WO 2005/003184.

Antistatic agents have also historically been referred to as continuity additives, antifouling agents, or the like. For consistency in this disclosure, the term "polymerization additive" will generally be used hereinafter. One method of using polymerization additives that is known in the art may be referred to as a liquid slurry polymerization additive, which may be pumped directly into the reactor. To facilitate feed of a polymerization additive to a gas phase reactor, the polymerization additive is slurried in a hydrocarbon, mineral oil, or other liquid media. Batches of such liquid slurry polymerization additive may be formed and stored in an additive feed vessel for continuous supply to the polymerization reactor. To maintain the polymerization additive suspended in the liquid medium, use of an agitated vessel is often required, adding complexity and cost to the polymerization process.

The drawbacks with utilizing liquid slurry polymerization additives include the relatively complex nature of the liquid slurry preparation method, where extra drying steps may be needed for both liquid and polymerization additive to reduce moisture content. Also, the transportation of liquid slurry polymerization additive containers throughout the world may be costly. Furthermore, a mixing skid or agitated vessel, the latter typically a mechanically agitated vessel, may be required to ensure that homogenous liquid slurry polymerization additive is charged into the reactor, because the polymerization additive may settle out of the liquid over time.

SUMMARY OF THE DISCLOSURE

Disclosed herein is a process for preparing a viscosified liquid slurry polymerization additive. The process comprises contacting a polymerization additive with a liquid to form a liquid slurry polymerization additive, and shearing the liquid slurry polymerization additive to increase the viscosity of the liquid slurry polymerization additive and form the viscosified liquid slurry polymerization additive.

Also disclosed herein is a process for the polymerization of olefins. The process comprises contacting, under polymerization conditions, in a reactor system: a catalyst system, one or more monomers, and at least one viscosified liquid slurry polymerization additive.

Other aspects and advantages will be apparent to one of ordinary skill in the art from the following description and the appended claims.

DETAILED DESCRIPTION

Disclosed herein is a process for preparing a viscosified liquid slurry polymerization additive and a process for the polymerization of olefins using at least one viscosified liquid slurry polymerization additive. It has been found that the settling rate of polymerization additives in liquid slurry polymerization additives may be impacted by the amount of shear that the liquid slurry polymerization additives encounter during upstream processing, i.e., before placement in a feed vessel for supplying to a polymerization reactor. By controlling the extent of shearing of the liquid slurry polymerization additives during upstream processing, the settling rate of the polymerization additives out of the liquid may be decreased or settling may be eliminated. A decreased settling rate or the elimination of settling may, for example, minimize or eliminate the need for an agitated vessel or mixing skid and reduce the costs and improve the efficiency of the transportation and use of liquid slurry polymerization additives.

Polymerization Additive

As used herein, a polymerization additive includes a substance characterized by an ability to prevent or reduce fouling or sheeting, or impact the static levels in a polymerization reactor system, when the polymerization additive is introduced to the reactor system in an effective amount. The polymerization additive promotes a continuous reaction process by preventing or mitigating discontinuity events such as sheeting or chunking or impacting static levels in the reactor in a way that prevents or mitigates these events. Various polymerization additives are described in, for example, U.S. 2011/0184124, U.S. 2011/0077370, U.S. 2010/0289482, U.S. 2011/0256632, U.S. 2008/0319583, and U.S. 2007/0244271, among others.

The polymerization additive may comprise one, two, or two or more compounds, and any combination of the compounds discussed in this disclosure.

Polymerization additives may include one or more compounds selected from alkoxylated amines and carboxylic acid salts. Ethoxylated stearyl amines are commercially available from Croda and its affiliates, and supplied under the trade name ATMER 163. Another active substance is commercially available from Evonik Corporation, Parsippany, NJ and supplied under the trade name Varonic S 202.

Polymerization additives may include aluminum stearate, aluminum distearate, aluminum oleate, and oxol aluminum stearate. Compounds supplied commercially under the trade names OCTASTAT and STADIS may be suitable and are described in U.S. Pat. No. 5,026,795, available from Octel Starreon also known as Innospec Inc. Polymerization additives may also include polysulfones, polymeric polyamines, and (optionally oil-soluble) sulfonic acids.

As noted, polymerization additives may include a mixture of two or more of the materials herein. Such mixtures may include: alkoxylated amines and carboxylic acid salts; or alkoxylated amines and polysulfones; or alkoxylated amines and polymeric polyamines; or alkoxylated amines and sulfonic acids; or carboxylic acid salts and polysulfones; or carboxylic acid salts and polymeric polyamines; or carboxylic acid salts and sulfonic acids; or polysulfones and polymeric polyamines; or polysulfones and sulfonic acids; or polymeric polyamines and sulfonic acids. Additionally contemplated are alkoxylated amines, carboxylic acid salts and polysulfones; or alkoxylated amines, polymeric polyamines and sulfonic acids; or carboxylic acid salts, polysulfones and polymeric polyamines; or carboxylic acid salts, sulfonic acids and polysulfones; alkoxylated amines, carboxylic acid salts and polymeric polyamines; alkoxylated amines, carboxylic acid salts and sulfonic acids; alkoxylated amines, polysulfones and sulfonic acids; alkoxylated amines, polymeric polyamines and polysulfones; polysulfones, polymeric polyamines and sulfonic acids; carboxylic acid salts, polymeric polyamines and sulfonic acids. Combinations of three or four or more of these polymerization additives are also contemplated. These combinations may be combined at volumetric ratios of from 10:90 to 90:10, or 25:75 to 75:25, or 40:60 to 60:40, or 50:50, or in the case of three polymerization additives, 10:10:80 to 80:10:10 or 10:80:10.

Another suitable polymerization additive includes a mixture of 1-decene-polysulfone present in a concentration of 5-15 percent by weight of the mixture, a reaction product of N-tallow-1,3-diaminopropane and epichlorohydrin present in a concentration of 5-15 percent by weight of the mixture, dodecylbenzenesulfonic acid present in a concentration of 5-15 percent by weight of the mixture, and a hydrocarbon solvent in a concentration of 60-88 percent by weight of the mixture. This mixture is commercially available from Octel Starreon or its affiliates under the tradename OCTASTAT 3000 (which may also be available as STADIS 450) or OCTASTAT 2000 (which may also be available as STADIS 425), each of which may have a different percentage makeup than that discussed immediately above.

Poly-oxo-metal carboxylate compounds may also be suitable for use as polymerization additives. A "poly-oxo-metal carboxylate compound" is any linear or cyclic compound with at least one (e.g., di-, tri- or multiple) carboxylic acid group and at least one Group 2 to 14 metal atom.

The polymerization additive may include a scavenger or be contacted with a scavenger, for example, to neutralize water or other catalyst poisons in the polymerization additive. As used herein, "neutralize" refers to ability of the scavenger to react with catalyst poisons, such as water, so that the catalyst productivity is not adversely affected. "Adversely affected" as used here refers to a loss of 1% or more, alternatively, 5% or more, alternatively, 10% or more, alternatively, 15% or more, alternatively, 20% or more, alternatively, 25% or more, and, alternatively, 30% or more of catalyst productivity. The scavenger may be present in an amount of between about 0.25 and about 5.0 mole of scavenger per mole of water in the polymerization additive, preferably as measured prior to addition of the scavenger thereto. Higher and lower amounts of scavenger may be added.

Scavengers used herein may be any compound capable of neutralizing water. The various scavengers may use any mechanism of neutralizing water, such as forming a complex with the water, reacting with the water, etc.

A "scavenger" may be an organometallic compound that is reactive towards oxygen and/or water and/or polar compounds and which does not include the catalyst components, for example, the metallocene catalyst component, the activator, the optional carrier or the components remaining in or on the catalyst used in its preparation, for example toluene including any organometallic compounds used in the catalyst preparation. Non-limiting examples of scavenger compounds are those represented by the general formula $R_nM$, where M is a Group 12 or 13 element, each R, which can be the same or different, is a substituted or unsubstituted, straight or branched chain alkyl radical, cyclic hydrocarbyl, alxyl-cyclohydrocarbyl radical, aromatic radical, or alkoxide radical, and n is 2 or 3.

Additionally, the scavenger may be a hydrocarbon aluminum compound of the formula $AlR_{(3-a)}X_a$ where R is alkyl, cycloalkyl, aryl or a hydride radical. Each alkyl radical may be straight or branched chain having from 1 to 20 carbon atoms, alternatively, 1 to 10 carbon atoms. X is a halogen or hydride for example chlorine, bromine or iodine, chlorine is preferred; a is 0, 1 or 2.

Illustrative, but non-limiting examples of such compounds of the above formulas can include when M is aluminum (Al), the trialkyl aluminums such as trimethyl aluminum, triethyl aluminum, tri-n-propyl aluminum, triisopropyl aluminum, tri-n-butyl aluminum, tri-sec-butyl aluminum, tri-t-butyl aluminum, tri-isobutyl aluminum, tri-n-pentyl aluminum, tricyclopentyl aluminum, tri-n-hexyl aluminum, tri-(4-methylpentyl) aluminum, tri-(3-methylpentyl) aluminum, tricyclohexyl aluminum, and the like; alkyl aluminums such as dimethylethyl aluminum, methyldiethyl aluminum, ethyldimethyl aluminum, dimethyl-n-propyl aluminum, methyl di-n-propyl aluminum, dimethylisopropyl aluminum, dimethylcyclohexyl aluminum, methylethylpropyl aluminum, and the like, aryl and alkyl-substituted aluminums, such as triphenyl aluminum, tri-p-tolyl aluminum, tri-m-tolyl aluminum, tri-p-ethyl aluminum, and the like. Additional non-limiting examples of typical scavengers include dialkyl aluminum halides, for instance diethylaluminum chlorides, ethyl aluminum dichlorides, bromides and iodides and dialkyl aluminum sesquichlorides, bromides and iodides; aluminum alkoxides and aryloxides such as dimethyl aluminum methoxide, dimethyl aluminum ethoxide, diethyl aluminum ethoxide, diethyl aluminum isopropoxide, methyl ethyl aluminum methoxide, dimethyl aluminum 4-methylphenoxide, demethyl aluminum 3-methylphenoxide, dimethyl aluminum 2,6-diisopropylphenoxide, dimethyl aluminum 2,6-di-t-butyl-4-methylphenoxide, and the like.

A similar list of illustrative Group 13 element compounds where M is boron may be made for the trialkyl boranes, alkyl boranes, and alkyl borane alkoxides. Also a similar list could be given for the analogous compounds of gallium and indium. Such list would be nearly identical to that already presented with respect to the aluminum species and therefore such listing of the borane analogues and other Group 13 elements analogues are not necessary to a complete disclosure.

Commonly used scavengers are those in the above formula where M is aluminum or boron. Of the aluminum species of Group 13 element compounds, the most often used as scavengers are alkylaluminum compounds, such as trialkylaluminum compounds, especially triethylaluminum, triisobutyl aluminum, and trimethylaluminum. Additional aluminum alkyl compounds include, for example, trimethylaluminum (TMAL), tri-n-hexylaluminum (TNHAL), and diethyl aluminum chloride (DEAC) and the like.

Liquid Slurry Polymerization Additive

The above described polymerization additives may be fed to polymerization processes as a slurry, thus providing an effective transport medium. For example, the polymerization additives may be initially admixed or combined with a slurry medium or liquid carrier, such as mineral oil, toluene, xylene, or other hydrocarbon solvents, to form a slurry that may be fed to the polymerization process.

Polymerization additives are typically mixed with the slurry medium until a finely dispersed suspension of the polymerization additive in the slurry medium is formed. As noted in U.S. 2011/0256632, polyethylene imine polymerization additive dispersions may be quite stable when formed and may take a "long time" to settle out from the mineral oil to any appreciable extent once formed as long as the slurry is agitated. Unfortunately, a "long time" is relative when dealing with commercial scale production and worldwide distribution. The "long time" noted in U.S. 2011/0256632 also requires continuous agitation. As noted above, settling of polymerization additive from a liquid slurry polymerization additive that occurs during transportation or storage may require mixing skids or an agitated feed vessel to ensure homogenous liquid slurry polymerization additive is charged into the reactor. Further, the industry practice of production of large master batches of liquid slurry polymerization additive and/or use of large storage tanks can result in extended storage times.

Viscosified Liquid Slurry Polymerization Additive

It has been found that a liquid slurry polymerization additive may be viscosified to result in a stable suspension, such that the polymerization additive will not settle out of the liquid and a mixing skid or agitated feed vessel is not required before or during use in a polymerization process. The viscosified liquid slurry polymerization additive has a viscosity such that the polymerization additive does not settle out of solution for a time period of greater than 24 hours, 48 hours, 72 hours, 1 week, 2 weeks, 1 month, 3 months, or even longer. When it is stated herein that the polymerization additive does not settle solution for a given time period, it is meant that no portion of the polymerization additive settles out of solution during that time period. By "no portion" it is meant that no significant portion of the polymerization additive settles out of the solution such that it is visible to the naked eye.

Viscosified liquid slurry polymerization additives may be prepared by shearing of a liquid slurry polymerization additive. Shearing of liquid slurry polymerization additives increases the viscosity. The increased viscosity may result in a stable slurry that maintains the polymerization additive suspended in the liquid without the need for a mixing skid or agitation. Further, following viscosification, the performance of the polymerization additive for preventing or inhibiting discontinuity events may be unaltered or even improved.

The shearing of the liquid slurry polymerization additive may include mixing the liquid slurry polymerization additive for a length of time sufficient to form a viscosified liquid slurry polymerization additive. Shearing the polymerization additive slurry to increase a viscosity of the polymerization additive slurry and form a viscosified slurry may be performed at various time/shear rate combinations. A higher shear rate may require a shorter time period to viscosify the slurry, and vice-versa. The shearing may comprise mixing the liquid slurry polymerization additive at a selected shear rate over a selected time period to result in a viscosified liquid slurry polymerization additive having a viscosity such that the polymerization additive does not settle out for a time period of at least 24 hours, 48 hours, 72 hours, 1 week, 2 weeks, 1 month, 3 months, or even longer.

The mixing may be performed with an impeller-type agitator. An impeller-type agitator or other type of agitator may be rotated at a speed of 100 to 1500 rpm or more, such as in the range from a lower limit of about 250, 500, or 750 rpm to an upper limit of about 500, 750, 1000, 1250 rpm, where any lower limit may be combined with any upper limit. The agitator may impart a shear rate of 50 s$^{-1}$ to 1000 s$^{-1}$ or greater, or at least 50 s$^{-1}$, 100 s$^{-1}$, 250 s$^{-1}$, 500 s$^{-1}$, 1000 s$^{-1}$, or greater. Any suitable agitator type may be used to impart the necessary shear to result in viscosification. The agitator may have a diameter in the range from about 4 inches to about 1 foot or more. Shearing may be performed over a time period ranging from a lower limit of 1 hour, 2 hours, 3 hours, 6 hours, 12 hours, or 1 day to an upper limit of 6 hours, 12 hours, 1 day, 2 days, 4 days, or 1 week, where any lower limit may be combined with any upper limit.

The slurry may be heated or cooled to increase the effectiveness of the shearing on viscosification. For example, the liquid slurry polymerization additive may be heated from ambient temperature (about 25° C.) or its current temperature to a temperature in the range of from about 30° C. to about 80° C., or from about 40° C. to about 70° C., before and/or during shearing.

The viscosified liquid slurry polymerization additive may have a viscosity of at least 2000 cP, 2500cP, 3000 cP, or 3500 cP measured at 22° C. The viscosified liquid slurry polymerization additive may include from about 1 wt % to about 60 wt % polymerization additive.

Once formed, the viscosified liquid slurry polymerization additive may be used in a process for the polymerization of olefins. The process comprises contacting, under polymerization conditions, in a reactor system: a catalyst system, one or more monomers, and at least one viscosified liquid slurry polymerization additive.

The polymerization additive used to form the polymerization additive slurry and the viscosified polymerization additive slurry may be aluminum di-stearate or a mixture of aluminum di-stearate and one or more additional polymerization additives and/or scavengers. The slurry medium may include mineral oil, toluene, xylene, or other hydrocarbon solvents or mixtures thereof. For example, mineral oils having a viscosity of less than 500 cP, 750 cP, 1000 cP, or 1500 cP at 22° C. prior to viscosification may be used. The resulting liquid slurry polymerization additive may have a viscosity in the range from about 100 cP to about 2000 cP, such as from about 200 to about 1500 cP, measured at 22° C., prior to viscosification. Viscosification may result in a viscosified liquid slurry polymerization additive having a viscosity of greater than 2000 cP, 2500 cP, 3000 cP, or 3500 cP, measured at 22° C. For viscosity measurements, temperature is controlled at 22° C. and the rheometer is fitted with the appropriate spindle for the test material, as specified in the rheometer's application guide.

Catalyst Systems

As noted above, sheeting, chunking and fouling may result from use of Ziegler Natta and metallocene catalysts, among others. Viscosified liquid slurry polymerization additives may thus be used to decrease the frequency of discontinuity events with any type of polymerization catalyst, including liquid-form catalysts, solid catalysts, and heterogeneous or supported catalysts, among others, which may be fed to the reactor as a liquid, slurry (liquid/solid mixture), or as a solid (typically gas transported). These catalysts may be used alone or in various combinations or mixtures. For example, one or more liquid catalysts, one or more solid catalysts, one or more supported catalysts, or a mixture of a liquid catalyst and/or a solid or supported catalyst, or a mixture of solid and supported catalysts may be used. These catalysts may be used with co-catalysts, activators, and/or promoters well known in the art. Examples of suitable catalysts include:

A. Ziegler-Natta catalysts, including titanium based catalysts, such as those described in U.S. Pat. Nos. 4,376,062 and 4,379,758. Ziegler-Natta catalysts are well known in the art, and typically are magnesium/titanium/electron donor complexes used in conjunction with an organoaluminum co-catalyst.

B. Chromium based catalysts, such as those described in U.S. Pat. Nos. 3,709,853; 3,709,954; and 4,077,904.

C. Vanadium based catalysts, such as vanadium oxychloride and vanadium acetylacetonate, such as described in U.S. Pat. No. 5,317,036.

D. Metallocene catalysts, such as those described in U.S. Pat. Nos. 6,933,258 and 6,894,131.

E. Cationic forms of metal halides, such as aluminum trihalides.

F. Cobalt catalysts and mixtures thereof, such as those described in U.S. Pat. Nos. 4,472,559 and 4,182,814.

G. Nickel catalysts and mixtures thereof, such as those described in U.S. Pat. Nos. 4,155,880 and 4,102,817.

H. Rare Earth metal catalysts, i.e., those containing a metal having an atomic number in the Periodic Table of 57 to 103, such as compounds of cerium, lanthanum, praseodymium, gadolinium and neodymium. Especially useful are carboxylates, alcoholates, acetylacetonates, halides (including ether and alcohol complexes of neodymium trichloride), and allyl derivatives of such metals. In various embodiments, neodymium compounds, particularly neodymium neodecanoate, octanoate, and versatate, are particularly useful rare earth metal catalysts. Rare earth catalysts may be used, for example, to polymerize butadiene or isoprene.

As used herein, a "catalyst system" may include at least one activator or cocatalyst. A catalyst system may also include other components, for example, supports. The catalyst system may include any suitable number of catalyst components in any combination.

Herein, the expression "bimodal catalyst composition" (or "bimodal catalyst system") denotes a catalyst composition (or catalyst system) useful to catalyze a polymerization reaction to produce a bimodal polymer. A bimodal catalyst composition includes at least two catalyst compounds: at least one (sometimes referred to herein as an "HMW catalyst") for catalyzing polymerization of a high molecular weight fraction of the product and at least one (sometimes referred to herein as an "LMW catalyst") for catalyzing polymerization of a low molecular weight fraction of the product. The bimodal catalyst composition may be bimetallic. The catalyst compound for producing a low molecular weight polymer fraction may be a metallocene. Additionally, one catalyst component may be a modified Ziegler-Natta catalyst and the second catalyst component may be a single site catalyst compound, such as a metallocene catalyst compound. Additionally, both catalyst components may be single site catalyst compounds, such as metallocene catalyst compounds.

The catalyst systems may allow for production of polymers having bimodal composition distributions in a single reactor.

Bimodal catalyst systems that may be useful are disclosed, for example, in U.S. 2012/0271017, U.S. 2012/0046428, U.S. 2012/0271015, and U.S. 2011/0275772, each of which are incorporated herein by reference.

The catalyst system may include one or more compositions that include one or more Group 15 and metal containing catalyst compounds. The Group 15 and metal containing compound generally includes a Group 3 to 14 metal atom (preferably a Group 3 to 7, more preferably a Group 4 to 6, and even more preferably a Group 4 metal atom) bound to at least one leaving group and also bound to at least two Group 15 atoms, at least one of which is also bound to a Group 15 or 16 atom through another group.

At least one of the Group 15 atoms may also bound to a Group 15 or 16 atom through another group which may be a $C_1$ to $C_{20}$ hydrocarbon group, a heteroatom containing group, silicon, germanium, tin, lead, or phosphorus, wherein the Group 15 or 16 atom may also be bound to nothing or a hydrogen, a Group 14 atom containing group, a halogen, or a heteroatom containing group, and wherein each of the two Group 15 atoms are also bound to a cyclic group and may optionally be bound to hydrogen, a halogen, a heteroatom or a hydrocarbyl group, or a heteroatom containing group.

The Group 15 and metal containing compound may be represented by the formulae:

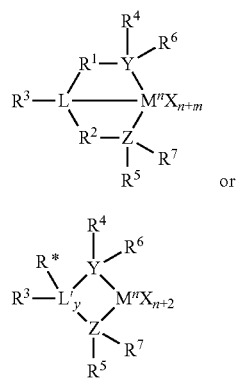

wherein M is a Group 3 to 12 transition metal, a Group 13 or 14 main group metal, a Group 4, 5, or 6 metal, more preferably a Group 4 metal, or zirconium, titanium or hafnium; each X is independently a leaving group, such as an anionic leaving group, or hydrogen, a hydrocarbyl group, a heteroatom or a halogen, or an alkyl; y is 0 or 1 (when y is 0 group L' is absent); n is the oxidation state of M, such as +3, +4, or +5; m is the formal charge of the YZL or the YZL' ligand, such as 0, −1, −2 or −3; L is a Group 15 or 16 element, preferably nitrogen; L' is a Group 15 or 16 element or Group 14 containing group, preferably carbon, silicon or germanium; Y is a Group 15 element, such as nitrogen or phosphorus; Z is a Group 15 element, such as nitrogen or phosphorus; $R^1$ and $R^2$ are independently a $C_1$ to $C_{20}$ hydrocarbon group, a heteroatom containing group having up to twenty carbon atoms, silicon, germanium, tin, lead, halogen or phosphorus, or a $C_2$ to $C_{20}$ alkyl, aryl or arylalkyl group, or a linear, branched or cyclic $C_2$ to $C_{20}$ alkyl group, or a $C_2$ to $C_6$ hydrocarbon group. $R^1$ and $R^2$ may also be interconnected to each other. $R^3$ is absent or a hydrocarbon group, hydrogen, a halogen, a heteroatom containing group or a linear, cyclic or branched alkyl group having 1 to 20 carbon atoms or $R^3$ is absent, hydrogen or an alkyl group or $R^3$ is hydrogen. $R^4$ and $R^5$ are independently an alkyl group, an aryl group, substituted aryl group, a cyclic alkyl group, a substituted cyclic alkyl group, a cyclic arylalkyl group, a substituted cyclic arylalkyl group or multiple ring system, preferably having up to 20 carbon atoms, more preferably between 3 and 10 carbon atoms or a $C_1$ to $C_{20}$ hydrocarbon group, a $C_1$ to $C_{20}$ aryl group or a $C_1$ to $C_{20}$ arylalkyl group, or a heteroatom containing group. $R^1$ and $R^2$ may be interconnected to each other and/or $R^4$ and $R^5$ may be interconnected to each other. $R^6$ and $R^7$ are independently absent, or hydrogen, an alkyl group, halogen, heteroatom or a hydrocarbyl group or a linear, cyclic or branched alkyl group having 1 to 20 carbon atoms or absent. $R^*$ is absent, or is hydrogen, a Group 14 atom containing group, a halogen, or a heteroatom containing group.

By "formal charge of the YZL or YZL' ligand", it is meant the charge of the entire ligand absent the metal and the leaving groups X.

By "$R^1$ and $R^2$ may be interconnected" it is meant that $R^1$ and $R^2$ may be directly bound to each other or may be bound to each other through other groups. By "$R^4$ and $R^5$ may be interconnected" it is meant that $R^4$ and $R^5$ may be directly bound to each other or may be bound to each other through other groups.

An alkyl group may be linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbamoyl radicals, alkyl- or dialkyl-carbamoyl radicals, acyloxy radicals, acylamino radicals, aroylamino radicals, straight, branched or cyclic, alkylene radicals, or combination thereof. An aralkyl group is defined to be a substituted aryl group.

$R^4$ and $R^5$ may be independently a group represented by the following formula:

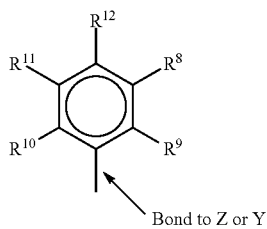

wherein $R^8$ to $R^{12}$ are each independently hydrogen, a $C_1$ to $C_{40}$ alkyl group, a halide, a heteroatom, a heteroatom containing group containing up to 40 carbon atoms or a $C_1$ to $C_{20}$ linear or branched alkyl group or a methyl, ethyl, propyl or butyl group. Any two R groups may form a cyclic group and/or a heterocyclic group. The cyclic groups may be aromatic. Additionally, $R^9$, $R^{10}$ and $R^{12}$ may be independently a methyl, ethyl, propyl or butyl group (including all isomers). Additionally, $R^9$, $R^{10}$ and $R^{12}$ may be methyl groups, and $R^8$ and $R^{11}$ may be hydrogen.

$R^4$ and $R^5$ may also both be a group represented by the following formula:

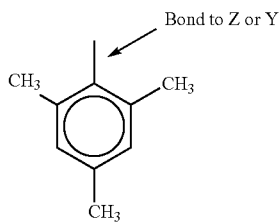

where, in Formula I or II above, M is a Group 4 metal, such zirconium, titanium or hafnium, or zirconium; each of L, Y, and Z is nitrogen; each of $R^1$ and $R^2$ is —$CH_2$—$CH_2$—; $R^3$ is hydrogen; and $R^6$ and $R^7$ are absent.

The Group 15 and metal containing compound may be represented by the structure below:

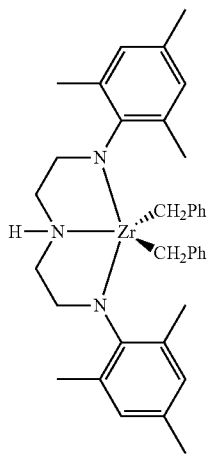

where "Ph" denotes phenyl. The compound $CH_2Ph$ is also referred to herein as "benzyl" or "Bz".

As noted above, the catalyst component may include one or more metallocene compounds (also referred to herein as metallocenes).

Generally, metallocene compounds include half and full sandwich compounds having one or more ligands bonded to at least one metal atom. Typical metallocene compounds are generally described as containing one or more ligand(s) and one or more leaving group(s) bonded to at least one metal atom.

The ligands are preferably ring(s) or ring system(s) typically composed of atoms selected from Groups 13 to 16 of the Periodic Table of Elements, for example the atoms may be selected from the group consisting of carbon, nitrogen, oxygen, silicon, sulfur, phosphorous, germanium, boron and aluminum or a combination thereof. Most preferably, the ring(s) or ring system(s) are composed of carbon atoms such as but not limited to cyclopentadienyl ligands or cyclopentadienyl-type ligand structures, or other similar functioning ligand structure such as indenyl, a cyclooctatetraendiyl or an imide ligand. The metal atom is selected from Groups 3 through 15 and the lanthanide or actinide series of the Periodic Table of Elements, such as a transition metal from Groups 4 through 12 or Groups 4, 5 and 6 or Group 4.

The catalyst composition may include one or more metallocene catalyst compounds represented by the formula:

$$L^A L^B MQ_n \qquad (III)$$

where M is a metal atom from the Periodic Table of the Elements and may be a Group 3 to 12 metal or an atom from the lanthanide or actinide series of the Periodic Table of Elements or M is a Group 4, 5 or 6 transition metal, or M is a Group 4 transition metal, or M is zirconium, hafnium or titanium. The ligands, $L^A$ and $L^B$, are unsubstituted or substituted cyclopentadienyl ligands or cyclopentadienyl-type ligands, heteroatom substituted and/or heteroatom containing cyclopentadienyl-type ligands. Non-limiting examples of ligands include cyclopentadienyl ligands, cyclopentaphenanthreneyl ligands, indenyl ligands, benzindenyl ligands, fluorenyl ligands, octahydrofluorenyl ligands, cyclooctatetraendiyl ligands, cyclopentacyclododecene ligands, azenyl ligands, azulene ligands, pentalene ligands, phosphoyl ligands, phosphinimine (WO 99/40125), pyrrolyl ligands, pyrozolyl ligands, carbazolyl ligands, borabenzene ligands and the like, including hydrogenated versions thereof, for example tetrahydroindenyl ligands. $L^A$ and $L^B$ may also be any other ligand structure capable of π-bonding to M. $L^A$ and $L^B$ may comprise one or more heteroatoms, for example, nitrogen, silicon, boron, germanium, sulfur and phosphorous, in combination with carbon atoms. Other $L^A$ and $L^B$ ligands include but are not limited to amides, phosphides, alkoxides, aryloxides, imides, carbolides, borollides, porphyrins, phthalocyanines, corrins and other polyazomacrocycles. Independently, each $L^A$ and $L^B$ may be the same or different type of ligand that is bonded to M.

Independently, each $L^A$ and $L^B$ may be unsubstituted or substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbamoyl radicals, alkyl- or dialkyl-carbamoyl radicals, acyloxy radicals, acylamino radicals, aroylamino radicals, straight, branched or cyclic, alkylene radicals, or combination thereof. Substituent groups R have up to 50 non-hydrogen atoms, preferably from 1 to 30 carbons, that can also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, isopropyl, and the like. Other hydrocarbyl radicals include fluoromethyl, fluoroethyl, difluoroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris (trifluoromethyl)-silyl, methyl-bis(difluoromethyl)silyl, bromomethyldimethylgermyl and the like; and disubstituted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorous, oxygen, tin, sulfur, germanium and the like, including olefins such as but not limited to olefinically unsaturated substituents including vinyl-terminated ligands, for example but-3-enyl, prop-2-enyl, hex-5-enyl and the like. Also, at least two R groups, preferably two adjacent R groups, are joined to form a ring structure having from 3 to 30 atoms selected from carbon, nitrogen, oxygen, phosphorous, silicon, germanium, aluminum, boron or a combination thereof. Also, a substituent group R group such as 1-butanyl may form a carbon sigma bond to the metal M.

Other ligands may be bonded to the metal M, such as at least one leaving group Q. In one embodiment, Q is a monoanionic labile ligand having a sigma-bond to M. Depending on the oxidation state of the metal, the value for n is 0, 1 or 2 such that Formula III above represents a neutral metallocene catalyst compound.

Non-limiting examples of Q ligands include weak bases such as amines, phosphines, ethers, carboxylates, dienes, hydrocarbyl radicals having from 1 to 20 carbon atoms, hydrides or halogens and the like or a combination thereof. Two or more Qs may form a part of a fused ring or ring system. Other examples of Q ligands include those substituents for R as described above and including cyclobutyl, cyclohexyl, heptyl, tolyl, trifluromethyl, tetramethylene, pentamethylene, methylidene, methyoxy, ethyoxy, propoxy, phenoxy, bis(N-methylanilide), dimethylamide, dimethylphosphide radicals and the like.

The catalyst composition may also include one or more metallocene catalyst compounds where $L^A$ and $L^B$ of Formula III are bridged to each other by at least one bridging group, A, as represented by Formula IV:

$$L^A A L^B M Q_n \qquad (IV)$$

The compounds of Formula IV are known as bridged, metallocene catalyst compounds. $L^A$, $L^B$, M, Q and n are as defined above for Formula III. Non-limiting examples of bridging group A include bridging groups containing at least one Group 13 to 16 atom, often referred to as a divalent moiety such as but not limited to at least one of a carbon, oxygen, nitrogen, silicon, aluminum, boron, germanium and tin atom or a combination thereof. For example, bridging group A may contain a carbon, silicon or germanium atom. The bridging group A may also contain substituent groups R as defined above including halogens and iron. Non-limiting examples of bridging group A may be represented by $R'_2C$, $R'_2Si$, $R'_2Si$, $R'_2Ge$, $R'P$, where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen or two or more R' may be joined to form a ring or ring system. The bridged, metallocene catalyst compounds of Formula IV may have two or more bridging groups A (see, for example, EP 664 301 B1).

The R substituents on the ligands $L^A$ and $L^B$ of Formulas III and IV may be substituted with the same or different number of substituents on each of the ligands. The ligands $L^A$ and $L^B$ of Formulas III and IV may be the same or different from each other.

Where the catalyst is a bimodal catalyst composition, a ratio of the first catalyst component to the second catalyst component may be in the range from about 3:1 to about 10:1, such as from about 4:1 to about 8:1 or in the range from about 5:1 to about 6:1, such as about 5.5:1.

Activators

As used herein, the term "activator" may refer to any compound or combination of compounds, supported, or unsupported, which can activate a single site catalyst compound or component, such as by creating a cationic species of the catalyst component. For example, this can include the abstraction of at least one leaving group from the metal center of the single site catalyst compound/component. The activator may also be referred to as a "co-catalyst".

Alumoxane activators can be utilized as an activator. Alumoxane(s) or aluminoxane(s) are generally oligomeric compounds containing —Al(R)—O— subunits, where R is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is a halide. Mixtures of different alumoxanes and modified alumoxanes may also be used. For further descriptions, see U.S. Pat. Nos. 4,665,208; 4,952,540; 5,041,584; 5,091,352; 5,206,199; 5,204,419; 4,874,734; 4,924,018; 4,908,463; 4,968,827; 5,329,032; 5,248,801; 5,235,081; 5,157,137; 5,103,031; and EP 0 561 476; EP 0 279 586; EP 0 516 476; EP 0 594 218; and PCT Publication WO 94/10180.

Aluminum alkyl or organoaluminum compounds may also be used as activators, alone or in conjunction with aluminoxanes. Suitable compounds include, for example, trimethylaluminum, triethylaluminum, triisobutylaluminum, tri-n-hexylaluminum, tri-n-octylaluminum and the like.

For example, the activator can also include a Lewis acid or a non-coordinating ionic activator or ionizing activator, or any other compound including Lewis bases, aluminum alkyls, and/or conventional-type co-catalysts. In addition to methylaluminoxane ("MAO") and modified methylaluminoxane ("MMAO") mentioned above, illustrative activators can include, but are not limited to, aluminoxane or modified aluminoxane, and/or ionizing compounds, neutral or ionic, such as tri (n-butyl)ammonium tetrakis(pentafluorophenyl) boron, a trisperfluorophenyl boron metalloid precursor, a trisperfluoronaphthyl boron metalloid precursor, or any combinations thereof.

Supports

The catalyst compositions can include a support material or carrier. For example, the one or more catalyst components and/or one or more activators may be deposited on, contacted with, vaporized with, bonded to, or incorporated within, adsorbed or absorbed in, or on, one or more supports or carriers. Thus, the above described metallocene catalyst compounds and catalyst systems as well as conventional-type transition metal catalyst compounds and catalyst systems may be combined with one or more support materials or carriers using one of the support methods well known in the art or as described below. For example, a metallocene catalyst compound or catalyst system is in a supported form when deposited on, contacted with, or incorporated within, adsorbed or absorbed in, or on, a support or carrier.

As used herein, the terms "support" and "carrier" are used interchangeably and are any support material, including a porous support material, for example, talc, inorganic oxides, and inorganic chlorides. Other carriers include resinous support materials such as polystyrene, functionalized or crosslinked organic supports, such as polystyrene divinyl benzene polyolefins or other polymeric compounds, zeolites, clays, or any other organic or inorganic support material and the like, or mixtures thereof.

Illustrative support materials such as inorganic oxides include Group 2, 3, 4, 5, 13 or 14 metal oxides. The preferred supports include silica, which may or may not be dehydrated, fumed silica, alumina (see, for example, PCT Publication WO 99/60033), silica-alumina and mixtures thereof. Other useful supports include magnesia, titania, zirconia, magnesium chloride (U.S. Pat. No. 5,965,477), montmorillonite (EP 0 511 665), phyllosilicate, zeolites, talc, clays (U.S. Pat. No. 6,034,187), and the like. Also, combinations of these support materials may be used, for example, silica-chromium, silica-alumina, silica-titania and the like. Additional support materials may include those porous acrylic polymers described in EP 0 767 184, which is incorporated herein by reference. Other support materials include nanocomposites as disclosed in PCT Publication WO 99/47598; aerogels as disclosed in PCT Publication WO 99/48605; spherulites as disclosed in U.S. Pat. No. 5,972,510; and polymeric beads as disclosed in PCT Publication WO 99/50311.

The support material, such as an inorganic oxide, can have a surface area in the range of from about 10 m$^2$/g to about 700 m$^2$/g, pore volume in the range of from about 0.1 cm$^3$/g to about 4.0 cm$^3$/g and average particle size in the range of from about 5 microns to about 500 microns. Additionally, the surface area of the support material can be in the range from about 50 m$^2$/g to about 500 m$^2$/g, pore volume from about 0.5 cm$^3$/g to about 3.5 cm$^3$/g and average particle size of from about 10 microns to about 200 microns. Additionally, preferably the surface area of the support material can be in the range is from about 100 m$^2$/g to about 400 m$^2$/g, pore volume from about 0.8 cm$^3$/g to about 3.0 cm$^3$/g and average particle size is from about 5 microns to about 100 microns. The average pore size of the carrier typically is in the range of from about 10 Angstroms to about 1,000 Angstroms, from about 50 Angstroms to about 500 Angstroms, or from about 75 Angstroms to about 350 Angstroms.

Polymerization Processes

The polymerization processes used to form any of the polymer components can include, but are not limited to, high pressure, solution, slurry, and/or gas phase processes. Any one or more of the polyethylene components may be polymerized by a continuous gas phase process utilizing a fluidized bed reactor. A fluidized bed reactor can include a reaction zone and a so-called velocity reduction zone. The reaction zone can include a bed of growing polymer particles, formed polymer particles and a minor amount of catalyst particles fluidized by the continuous flow of the gaseous monomer and diluent to remove heat of polymerization through the reaction zone. Optionally, some of the re-circulated gases may be cooled and compressed to form liquids that increase the heat removal capacity of the circulating gas stream when readmitted to the reaction zone. A suitable rate of gas flow may be readily determined by simple experiment. Make up of gaseous monomer to the circulating gas stream can be at a rate equal to the rate at which particulate polymer product and monomer associated therewith can be withdrawn from the reactor and the composition of the gas passing through the reactor can be adjusted to maintain an essentially steady state gaseous composition within the reaction zone. The gas leaving the reaction zone can be passed to the velocity reduction zone where entrained particles are removed. Finer entrained particles and dust may be removed in a cyclone and/or fine filter. The gas can be passed through a heat exchanger where the heat of polymerization can be removed, compressed in a compressor, and then returned to the reaction zone. In another embodiment, the gas can be passed through a compressor, passed through a heat exchanger where the heat of polymerization can be removed, and then returned to the reaction zone. Additional reactor details and means for operating the reactor are described in, for example, U.S. Pat. Nos. 3,709,853; 4,003,712; 4,011,382; 4,302,566; 4,543,399; 4,882,400; 5,352,749; and 5,541,270; EP 0 802 202; and Belgian Patent No. 839,380.

The reactor temperature of the fluidized bed process can range from a low of 30° C., 40° C., 50° C., or 90° C. to a high of 100° C., 110° C., 120° C., or 130° C. In general, the reactor temperature can be operated at the highest temperature feasible taking into account the sintering temperature of the polymer product within the reactor. Regardless of the process used to make the polyolefins, e.g., bimodal polyethylene, the polymerization temperature or reaction temperature should be below the melting or "sintering" temperature of the polymer to be formed. Thus, the upper temperature limit may be the melting temperature of the polyolefin produced in the reactor.

Hydrogen gas can be often used in olefin polymerization to control the final properties of the polyolefin, such as described in "Polypropylene Handbook," at pages 76-78 (Hanser Publishers, 1996). Using certain catalyst systems, increasing concentrations (partial pressures) of hydrogen can increase the melt flow rate (MFR) (also referred to herein as melt index (MI)) of the polyolefin generated. The MFR or MI can thus be influenced by the hydrogen concentration. The amount of hydrogen in the polymerization can be expressed as a mole ratio relative to the total polymerizable monomer, for example, ethylene, or a blend of ethylene and 1-hexene or 1-butene or propylene. The amount of hydrogen used in the polymerization process can be an amount necessary to achieve the desired MFR or MI of the final polyolefin resin. The mole ratio of hydrogen to total monomer (H$_2$:monomer) can be in a range from greater than 0.0001, 0.0005, or 0.001 to less than 10, 5, 3, or 0.10, wherein a desirable range can include any combination of any upper mole ratio limit with any lower mole ratio limit described herein. Expressed another way, the amount of hydrogen in the reactor at any time may be up to 5,000 ppm, 4,000 ppm, or 3,000 ppm, or between 50 ppm and 5,000 ppm, or between 500 ppm and 2,000 ppm. Additionally, the hydrogen in the reactor may range from 1,000 ppm to 10,000 ppm, from 10,000 to 100,000 ppm, or from 100,000 to 200,000 ppm.

The one or more reactor pressures in a gas phase process (either single stage or two or more stages) may vary from 690 kPa (100 psig) to 3,448 kPa (500 psig), from 1,379 kPa (200 psig) to 2,759 kPa (400 psig), or from 1,724 kPa (250 psig) to 2,414 kPa (350 psig).

A staged reactor employing two or more reactors in series, where one reactor may produce, for example, a high molecular weight component and another reactor may produce a low molecular weight component can be used. For example, the polyolefin can be produced using a staged gas phase reactor. Such commercial polymerization systems are described in, for example, "Volume 2, Metallocene-Based Polyolefins," at pages 366-378 (John Scheirs & W. Kaminsky, eds. John Wiley & Sons, Ltd. 2000); U.S. Pat. Nos. 5,665,818; 5,677,375; and 6,472,484; and EP 0 517 868 and EP 0 794 200.

The amount of polymerization additive added to the reactor system may depend upon the catalyst system used, as well as reactor pre-conditioning (such as coatings to control static buildup) and other factors known to those skilled in the art. The polymerization additive may be added to the reactor in an amount ranging from 0.01 to 200 ppmw, based on polymer production rate. Additionally, the polymerization additive may be added to the reactor in an amount ranging from 0.02 to 100 ppmw, from 0.05 to 50 ppmw, or from 1 to 40 ppmw, based on polymer production rate. Additionally, the polymerization additive may be added to the reactor in an amount of 2 ppmw or greater, 10 ppmw or greater, or 50 ppmw or greater, based on polymer production rate.

Viscosified liquid slurry polymerization additives may also be used as or in a reactor coating emplaced during or prior to conducting polymerization reactions within the reactor. Polymerization additives within the slurry may interact with the particles and other components in the fluidized bed, impacting static charges and mitigating or eliminating related continuity events.

End Uses

The polyethylene compositions manufactured can be used in a wide variety of products and end-use applications. The polyethylene compositions can also be blended and/or coextruded with other polymers. Non-limiting examples of other polymers include linear low density polyethylenes, elastomers, plastomers, high pressure low density polyethylene, high density polyethylenes, polypropylenes and the like.

The polyethylene compositions and blends thereof are useful in forming operations such as film, sheet, and fiber extrusion and co-extrusion as well as blow molding, injection molding and rotary molding. Films can include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers can include melt spinning, solution spinning and melt blown fiber operations for use in woven or non-woven form to make filters, diaper fabrics, medical garments, geotextiles, etc. Extruded articles can include medical tubing, wire and cable coatings, pipe, geomembranes, and pond liners. Molded articles can include single and multi-layered constructions in the form of bottles, tanks, large hollow articles, rigid food containers and toys, etc.

Example

A liquid slurry polymerization additive was formed by admixing a mineral oil and aluminum di-stearate. The amount of polymerization additive was between 1 and 60 wt %, based on the weight of the liquid slurry. The slurry had an initial viscosity, as measured at 22° C. using a Brookfield Rheometer, of about 808 cP. The liquid slurry polymerization additive was then mixed using an impeller-type agitator rotating at 750-1200 rpm for a time period of about 4 days. Over the mixing period, the viscosity of the mixture increased, with the final viscosified slurry having a viscosity of about 3430 cP. Un-agitated samples of the slurry were observed over a time period of greater than one week without appearance of settling.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:

1. A process to form a viscosified liquid slurry polymerization additive, the process comprising:
    contacting a polymerization additive with a liquid to form a liquid slurry polymerization additive, wherein the polymerization additive comprises an aluminum stearate and at least one other material; and
    increasing a viscosity of the liquid slurry polymerization additive by shearing the liquid slurry polymerization additive to form the viscosified liquid slurry polymerization additive, wherein the shearing comprises mixing the liquid slurry polymerization additive with an agitator rotated at a speed within a range of from 750 rpm to 1250 rpm for a time period within a range of from one hour to one week.

2. The process of claim 1, wherein the viscosified liquid slurry polymerization additive has a viscosity such that the polymerization additive does not settle out of solution for greater than 48 hours.

3. The process of claim 1, wherein the viscosified liquid slurry polymerization additive has a viscosity such that the polymerization additive does not settle out of solution for greater than one week.

4. The process of claim 1, wherein the shearing comprises mixing the liquid slurry polymerization additive with an agitator and the agitator imparts a shear rate of 50 $s^{-1}$ to 1000 $s^{-1}$.

5. The process of claim 1, wherein the polymerization additive comprises aluminum di-stearate.

6. The process of claim 1, wherein the viscosified liquid slurry polymerization additive has a viscosity of at least 2500 cP measured at 22° C.

7. The process of claim 1, wherein the viscosified liquid slurry polymerization additive comprises from about 1 wt % to about 60 wt % polymerization additive, based on the weight of the viscosified liquid slurry polymerization additive.

8. A process for the polymerization of olefins, the process comprising:
    contacting, under polymerization conditions, in a reactor system:
        a catalyst system;
        one or more monomers; and
        at least one viscosified liquid slurry polymerization additive, wherein the polymerization additive comprises an aluminum stearate and at least one other material, wherein the viscosified liquid slurry polymerization additive is formed by:
            contacting a polymerization additive with a liquid to form a liquid slurry polymerization additive; and increasing a viscosity of the liquid slurry polymerization additive by shearing the liquid slurry polymerization additive, wherein the shearing comprises mixing the liquid slurry polymerization additive with an agitator rotated at a speed within a range of from 750 rpm to 1250 rpm for a time period within a range of from one hour to one week.

9. The process of claim 8, wherein the at least one viscosified liquid slurry polymerization additive is fed from a vessel that is not agitated.

10. The process of claim 8, wherein the at least one viscosified liquid slurry polymerization additive is fed from a vessel that is not continuously agitated.

11. The process of claim 8, wherein the viscosified liquid slurry polymerization additive has a viscosity such that the polymerization additive does not settle out of solution for greater than 48 hours.

12. The process of claim 8, wherein the viscosified liquid slurry polymerization additive has a viscosity such that the polymerization additive does not settle out of solution for greater than one week.

13. The process of claim 8, wherein the polymerization additive comprises aluminum di-stearate.

14. The process of claim 8, wherein the viscosified liquid slurry polymerization additive has a viscosity of at least 2500 cP measured at 22° C.

15. The process of claim 8, wherein the viscosified liquid slurry polymerization additive comprises from about 1 wt % to about 60 wt % polymerization additive, based on the weight of the viscosified liquid slurry polymerization additive.

16. The process of claim 8, wherein the catalyst system comprises a metallocene catalyst.

17. The process of claim 8, wherein the catalyst system comprises a bimodal catalyst.

* * * * *